(12) United States Patent
Yan et al.

(10) Patent No.: US 12,444,455 B2
(45) Date of Patent: Oct. 14, 2025

(54) MEMORY STRUCTURE

(71) Applicant: Fujian Jinhua Integrated Circuit Co., Ltd., Quanzhou (CN)

(72) Inventors: Yifei Yan, Quanzhou (CN); Hui-Huang Chen, Quanzhou (CN); Chao-Wei Lin, Quanzhou (CN)

(73) Assignee: Fujian Jinhua Integrated Circuit Co., Ltd., Quanzhou (CN)

( * ) Notice: Subject to any disclaimer, the term of this patent is extended or adjusted under 35 U.S.C. 154(b) by 148 days.

(21) Appl. No.: 18/376,455

(22) Filed: Oct. 4, 2023

(65) Prior Publication Data
US 2024/0412772 A1    Dec. 12, 2024

(30) Foreign Application Priority Data

Jun. 6, 2023  (CN) .......................... 202310661380.2
Jun. 6, 2023  (CN) .......................... 202321421522.X

(51) Int. Cl.
| | | |
|---|---|---|
| *G11C 11/408* | (2006.01) | |
| *G11C 5/06* | (2006.01) | |
| *G11C 11/4091* | (2006.01) | |
| *G11C 11/4096* | (2006.01) | |
| *H10B 12/00* | (2023.01) | |

(52) U.S. Cl.
CPC .......... *G11C 11/4085* (2013.01); *G11C 5/063* (2013.01); *G11C 11/4087* (2013.01); *G11C 11/4091* (2013.01); *G11C 11/4096* (2013.01); *H10B 12/315* (2023.02); *H10B 12/482* (2023.02); *H10B 12/488* (2023.02); *H10B 12/50* (2023.02)

(58) Field of Classification Search
CPC . G11C 11/4085; G11C 5/063; G11C 11/4087; G11C 11/4091; G11C 11/4096; H10B 12/315; H10B 12/482; H10B 12/488; H10B 12/50; H10B 12/05
USPC ..................................... 365/189.011, 230.06
See application file for complete search history.

(56) References Cited

U.S. PATENT DOCUMENTS

| | | | |
|---|---|---|---|
| 2005/0142756 A1* | 6/2005 | Park | H01L 21/76895 257/E21.59 |
| 2012/0063208 A1* | 3/2012 | Koyama | G11C 11/404 365/230.06 |
| 2014/0291804 A1 | 10/2014 | Kim | |
| 2016/0307910 A1* | 10/2016 | Son | H10B 43/40 |
| 2020/0151298 A1 | 5/2020 | Kim | |
| 2021/0065751 A1* | 3/2021 | Park | G11C 7/18 |
| 2021/0066280 A1* | 3/2021 | Park | H01L 24/08 |
| 2021/0082920 A1* | 3/2021 | Nonaka | H10B 41/70 |
| 2021/0202458 A1* | 7/2021 | Jung | H01L 24/29 |
| 2022/0344307 A1* | 10/2022 | Yoshihara | H01L 24/48 |
| 2024/0196620 A1* | 6/2024 | Yim | H10B 43/27 |
| 2024/0266170 A1* | 8/2024 | Lee | H10B 12/09 |

(Continued)

*Primary Examiner* — Michael T Tran
(74) *Attorney, Agent, or Firm* — Winston Hsu

(57) ABSTRACT

A memory structure includes a substrate, a first device layer disposed on the substrate, a plurality of memory regions in the first device layer, a plurality of word lines and bit lines in the first device layer to control memory cells of the memory regions, a second device layer disposed between the substrate and the first device layer, and first peripheral regions and second peripheral regions in the second device layer, wherein in a top view, the first peripheral regions and the second peripheral regions respectively partially overlap adjacent two of the memory regions.

17 Claims, 9 Drawing Sheets

(56) References Cited

U.S. PATENT DOCUMENTS

| | | | |
|---|---|---|---|
| 2024/0386959 A1* | 11/2024 | Yu | H10B 41/10 |
| 2025/0056799 A1* | 2/2025 | Kang | H10B 43/10 |
| 2025/0081459 A1* | 3/2025 | Noh | H10D 64/033 |
| 2025/0210098 A1* | 6/2025 | Si | H10B 12/50 |
| 2025/0220930 A1* | 7/2025 | Choe | H10D 84/209 |

* cited by examiner

MEMORY STRUCTURE

BACKGROUND OF THE INVENTION

1. Field of the Invention

The present invention relates to semiconductor technology. In particular, the present invention relates to a semiconductor memory structure.

2. Description of the Prior Art

A dynamic random access memory (DRAM) device is a kind of volatile memory. A DRAM device usually includes a memory region including an array of memory cells and a peripheral region including control circuits.

In a conventional DRAM device, the memory region and the peripheral region are usually formed in a same device layer for facilitations of process integration and connecting the word lines and bit lines that control writing and reading operations of the memory cells directly to the peripheral region.

However, the allocation of peripheral region in the same device layer as the memory region may cause waste of usable areas of the substrate, reducing the cell ratio of the DRAM device. Furthermore, the advantages of process integration has gradually diminish because the process margin of integrally forming the memory region and the peripheral region has been tightened due to shrinkage of devices and increased complexity of circuit design, which may result in yield loss and increasing the manufacturing cost.

SUMMARY OF THE INVENTION

One objective of the present invention is to provide a memory structure which has the memory regions and peripheral regions formed in different device layers, so that the peripheral regions do not occupy areas between memory regions, and the cell ratio of the memory structure may be effectively increased. A larger memory capacity of the memory structure may be achieved.

One embodiment of the present invention provides a memory structure including a substrate, a first device layer disposed on the substrate, a plurality of memory regions in the first device layer, a plurality of word lines and bit lines in the first device layer to control memory cells of the memory regions, a second device layer disposed between the substrate and the first device layer, and first peripheral regions and second peripheral regions in the second device layer, wherein in a top view, the first peripheral regions and the second peripheral regions respectively partially overlap adjacent two of the memory regions.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute a part of this specification. The drawings illustrate some of the embodiments and, together with the description, serve to explain their principles. Relative dimensions and proportions of parts of the drawings have been shown exaggerated or reduced in size, for the sake of clarity and convenience in the drawings. The same reference signs are generally used to refer to corresponding or similar features in modified and different embodiments.

DETAILED DESCRIPTION

To provide a better understanding of the present invention to those of ordinary skill in the art, several exemplary embodiments of the present invention will be detailed as follows, with reference to the accompanying drawings using numbered elements to elaborate the contents and effects to be achieved. Other embodiments may be utilized and that structural, logical and electrical changes may be made without departing from the spirit and scope of the present invention.

Figure 1:
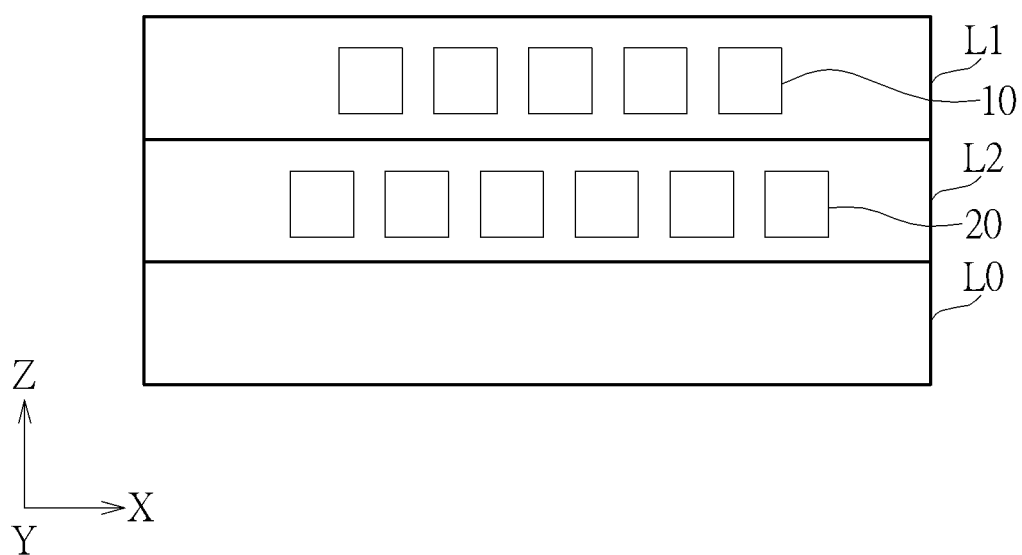
FIG. 1 is a schematic cross-sectional view of a memory structure according to one embodiment of the present invention.
Figure 2:
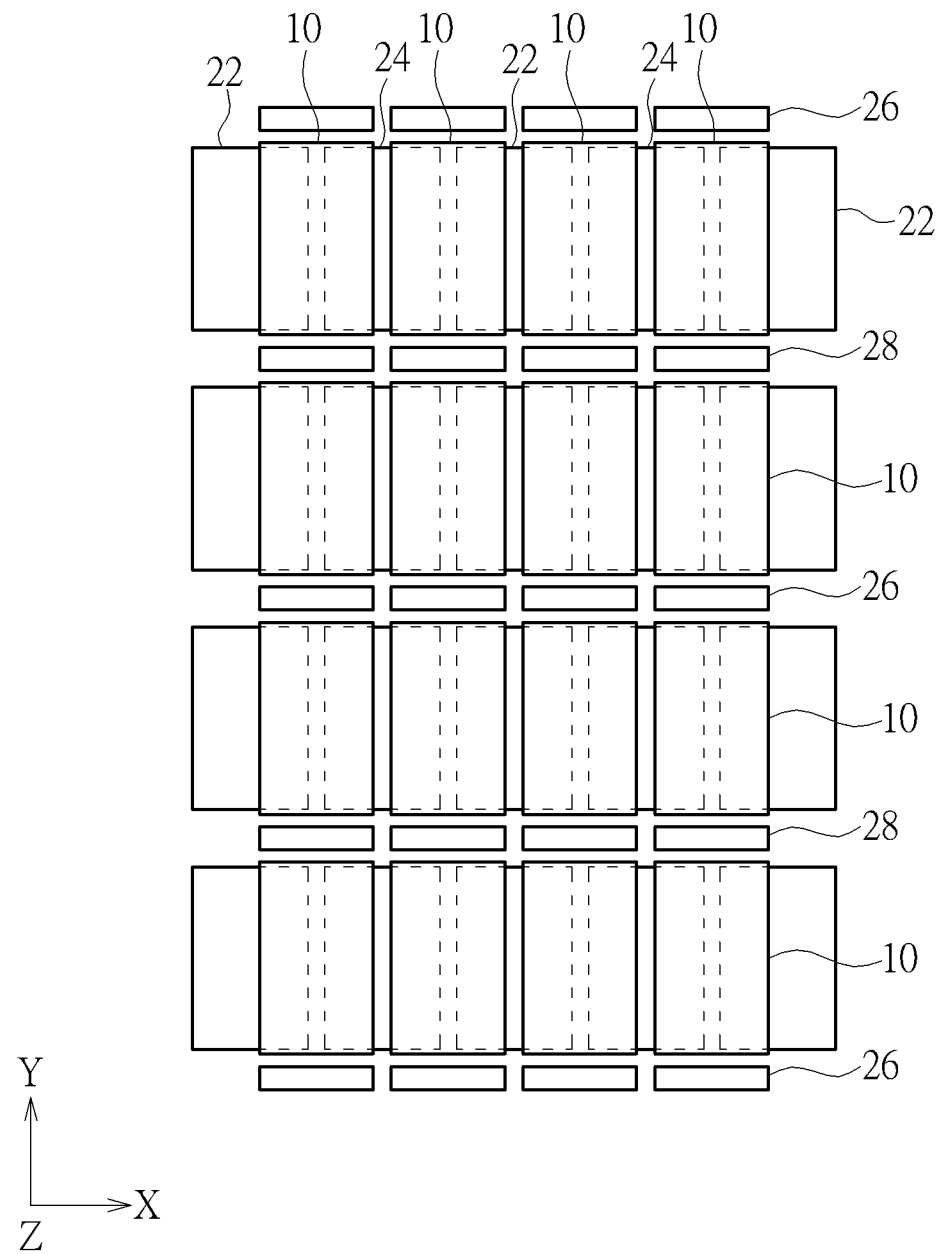
FIG. 2 is a schematic top view showing a layout of a memory structure according to one embodiment of the present invention.

FIG. 1 is a schematic cross-sectional view of a memory structure on the XZ plane according to one embodiment of the present invention. FIG. 2 is a schematic top view showing a layout of a memory structure on the XY plane according to one embodiment of the present invention. The plane defined by the X direction and the Z direction is referred as the XZ plane. The plane defined by the X direction and the Y direction is referred to as the XY plane. The X direction and the Y direction are perpendicular. The Z direction is perpendicular to the XY plane.

Please refer to FIG. 1. The memory structure of the present invention includes a substrate L0, a first device layer L1 disposed on the substrate L0, and a second device layer L2 disposed between the substrate L0 and the first element layer L1. The first device layer L1 includes a plurality of memory regions 10, and a plurality of bit lines BL and a plurality of word lines WL for controlling the writing and reading operations of the memory cells MC of the memory regions 10. The second device layer L2 includes a plurality of peripheral regions 20. The substrate L0 may include any material layer or structure that provides structure support for the memory structure. The substrate L0 may include a semiconductor substrate, a wafer, a chip, or a circuit board, but is not limited thereto. The structure shown in FIG. 1 may be obtained by sequentially forming the first device layer L1 and the second device layer L2 on the substrate L0 through semiconductor manufacturing processes. In some embodiments of the present invention, the structure shown in FIG.

1 may be obtained by forming the first device layer L1 on the second device layer L2 and then bonding the second device layer L2 to the substrate L0.

Please refer to FIG. 2. The memory regions 10 are arranged into rows and columns along the X direction and the Y direction. The peripheral regions 20 include first peripheral regions 22, second peripheral regions 24, third peripheral regions 26, and fourth peripheral regions 28. The memory regions 10 are formed in the first device layer L1. The peripheral regions 20 are formed in the second device layer L2 (see FIG. 1). In some cases, some of the peripheral regions 20 not overlapped with the memory regions 10 (such as the third peripheral regions 26 and the fourth peripheral regions 28) may be formed in the first device layer L1. The first peripheral regions 22 and the second peripheral regions 24 respectively include peripheral circuits for controlling the bit lines BL (shown in FIG. 3), such as row decoders and sense amplifiers. The third peripheral regions 26 and the fourth peripheral regions 28 respectively include peripheral circuits for controlling the word lines WL (shown in FIG. 3), such as column decoders. The first peripheral regions 22 and the second peripheral regions 24 are alternately arranged in rows along the X direction, and are located under the memory regions 10, respectively between two adjacent memory regions 10 and partially overlapped with the two adjacent memory regions 10. In other words, each of the first peripheral regions 22 and the second peripheral regions 24 overlaps two memory regions 10 that are adjacent to each other. The third peripheral regions 26 and the fourth peripheral regions 28 are arranged in respective rows along the X direction, and the rows of the third peripheral regions 26 and the rows of the fourth peripheral regions 28 are alternately interposed between the memory regions 10 along the Y direction and are adjacent to the upper and lower edges of the memory regions 10. The third peripheral regions 26 and the fourth peripheral regions 28 are not overlapped with the memory regions 10.

Figure 3:
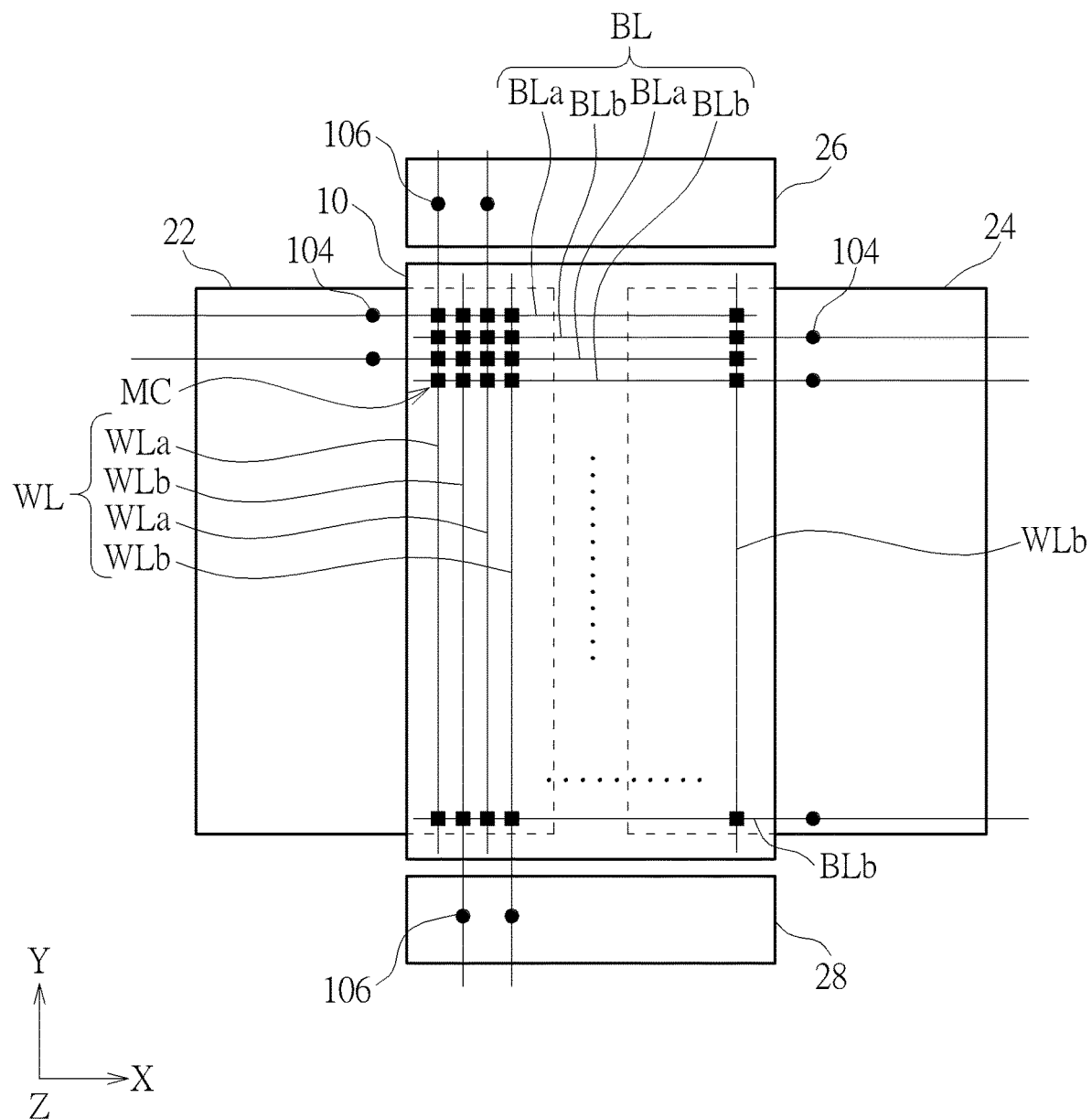
FIG. 3 is a schematic top view showing a layout of a memory structure according to one embodiment of the present invention.

Please refer to FIG. 3, which is a schematic top view showing a layout of a memory structure on the XY plane according to one embodiment of the present invention. To simplify the drawing, only one memory region of the memory structure and the peripheral regions related to controlling the memory region are shown in FIG. 3. It should be understood by those skilled in the art that the following description, based on FIG. 3, is applicable to other memory regions and peripheral regions of the memory structure. As shown in FIG. 3, the memory structure includes a memory region 10, a first peripheral region 22 and a second peripheral region 24 at two sides (or the left side and the right side) of the memory region 10 along the X direction, and a third peripheral region 26 and a fourth peripheral region 28 at two sides (or the upper side and the lower side) of the memory region 10 along the Y direction. The first peripheral region 22 and the second peripheral region 24 are separated from each other, and respectively partially overlap the memory region 10. The third peripheral region 26 and a fourth peripheral region 28 may border or be adjacent to the upper edge and lower edge of the memory region 10, and substantially do not overlap the memory region 10. The bit lines BL extend along the X direction and are arranged in parallel along the Y direction. The word lines WL extend along the Y direction and are arranged in parallel along the X direction. The memory cells MC of the memory region 10 are approximately located at the intersection regions of the bit lines BL and word lines WL. The bit lines BL are classified into odd rows and even rows, wherein the odd rows of bit lines BLa are controlled by the first peripheral region 22, and the even rows of bit lines BLb are controlled by the second peripheral region 24. The word lines WL are classified into odd columns and even columns, wherein the odd columns of word lines WLa are controlled by the third peripheral region 26, and the even columns of word lines WLb are controlled by the fourth peripheral region 28. In some embodiments of the present invention, the first peripheral region 22 simultaneously controls the odd rows of bit lines BLa from the memory region 10 shown in FIG. 3 and a neighboring memory region (not shown) that is next to the left side of the memory region 10 and is overlapped with the first peripheral region 22. The second peripheral region 24 simultaneously controls the even rows of bit lines BLb from the memory region 10 shown in FIG. 3 and a neighboring memory region (not shown) that is next to the right side of the memory region 10 and is overlapped with the second peripheral region 24. The third peripheral region 26 simultaneously controls the odd columns of word lines WLa from the memory regions 10 shown in FIG. 3 and a neighboring memory region (not shown) adjacent to the upper side of the memory region 10. The fourth peripheral region 28 simultaneously controls the even columns of word lines WLa from the memory regions 10 shown in FIG. 3 and a neighboring memory region (not shown) adjacent to the lower side of the memory region 10.

Please continue to refer to FIG. 3. The memory structure further includes a plurality of interconnecting structures 104 that are used to electrically connect the bit lines BL to the first peripheral region 22 or the second peripheral region 24, respectively. Each of the interconnecting structures 104 may be composed of a single conductive portion or multiple conductive portions. The design of vertically overlapping the memory region 10 with the first peripheral region 22 and the second peripheral region 24 provide more options for arranging the interconnecting structures 104 either in the layout region of the memory region 10 overlapped with the first peripheral region 22 or the second peripheral region 24, or in the layout regions of the first peripheral region 22 or the second peripheral region 24 not overlapped with the memory regions 10, as shown in FIG. 3. The arrangements of the interconnecting structures 104 may be adjusted as long as being able to electrically connect the bit lines BL to the corresponding peripheral regions. In this way, the design flexibility may be improved, and the routing distances of bit lines interconnections may be reduced, so that power loss due to interconnection impedance may also be reduced. The interconnecting structures 104 may be substantially formed in the second device layer L2, or may include conductive portions formed in the second device layer L2 and the first device layer L1.

The memory structure further includes a plurality of interconnecting structures 106 that are used to electrically connect the word lines WL to the third peripheral region 26 and the fourth peripheral region 28, respectively. Each of the interconnecting structures 106 may be composed of a single conductive portion or multiple conductive portions. The interconnecting structures 106 may be arranged either in the layout region of the memory region 10, or in the layout regions of the third peripheral region 26 or the fourth peripheral region 28 as shown in FIG. 3. The positions of the interconnecting structures 106 may be adjusted as long as being able to electrically connect the word lines WL to the corresponding peripheral regions. The interconnecting structures 106 may be substantially formed in the first device layer L1 or may include conductive portions formed in the second device layer L2 and the first device layer L1.

It should be noted that the interconnecting structures 104 and 106 shown in FIG. 3 are schematic for the purpose of illustratively showing that the odd rows of bit lines BLa, the even rows of bit lines BLb, the odd columns of word lines WLa, and the odd columns of word lines WLb are respectively electrically connected to the first peripheral region 22, the second peripheral region 24, the third peripheral region 26, and the fourth peripheral region 28. The arrangements of the interconnecting structures 104 and 106 of the memory structure are not limited to the design of FIG. 3, and may be adjusted according to design needs. The conductive portions of the interconnecting structures 104 and 106 may include vias and/or metal lines, but are not limited thereto. The material of the conductive portions may include conductive metals, such as tungsten (W), copper (Cu), aluminum (Al), titanium (Ti), tantalum (Ta), a compound, an alloy or a composite layer of the above metal materials, but are not limited thereto.

Figure 4:
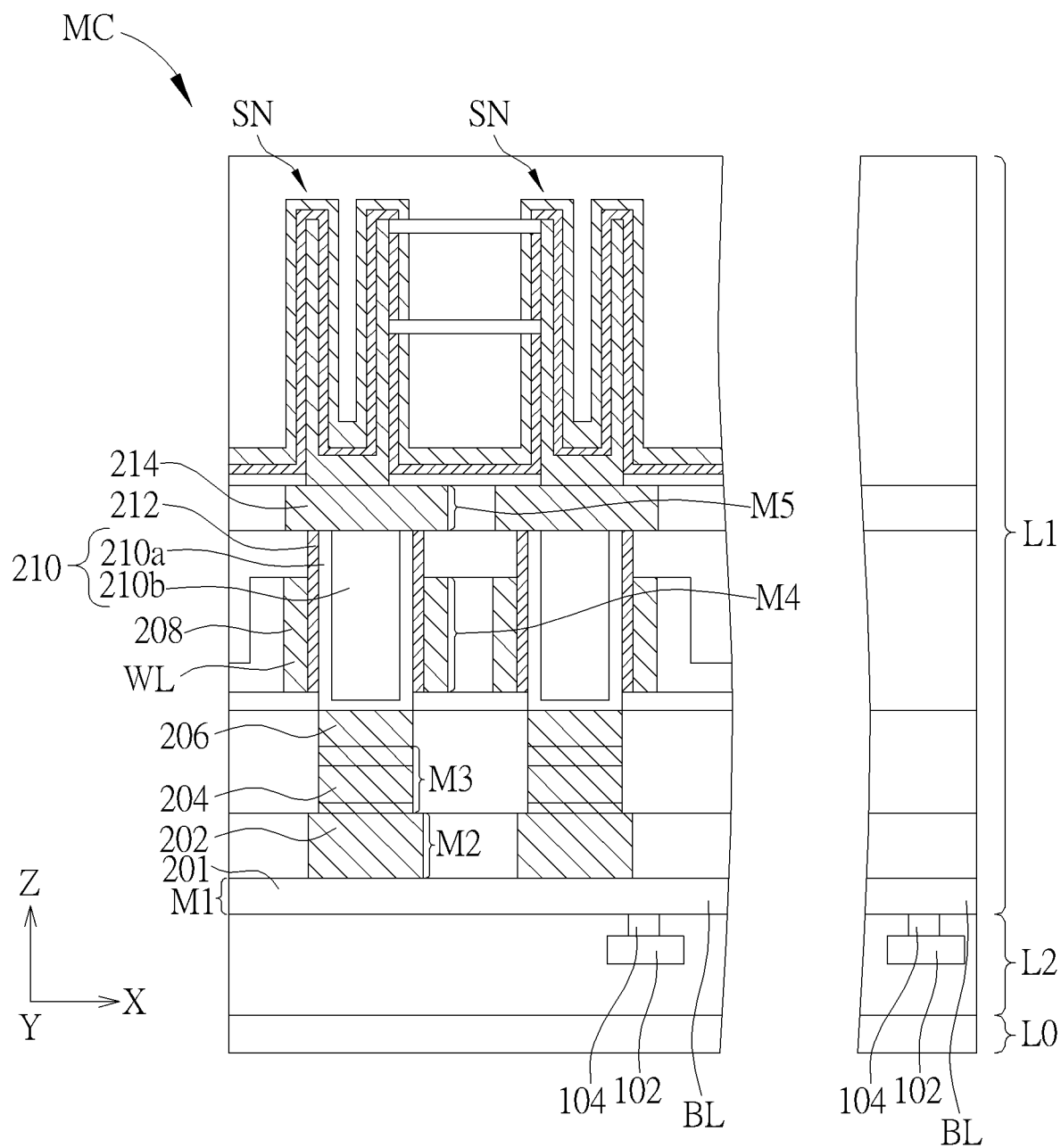
FIG. 4 is a schematic cross-sectional view of a memory structure according to an embodiment of the present invention.

Please refer to FIG. 4, which is a schematic cross-sectional view of a memory structure according to an embodiment of the present invention, wherein the memory cells of the memory structure are respectively composed of a transistor and a capacitor (1TIC), wherein the transistor controls the charging and discharging of the capacitor to store a binary data. The transistor of the memory cell has a vertical channel structure, wherein the upper and lower ends of the vertical channel structure are the two control terminals of the memory cell, and are respectively electrically connected to a bit line and a word line. By implementing the memory structure as shown in FIG. 4 and the layout design as shown in FIG. 2 and FIG. 3, a memory structure having improved cell ratio may be obtained.

As shown in FIG. 4, the memory structure includes a substrate L0, a first device layer L1 disposed on the substrate 10, and a second device layer L2 disposed between the substrate L0 and the first device layer L1. The first device layer L1 includes a plurality of memory cells MC, and a plurality of bit lines BL and word lines WL that control the memory cells MC. In detail, each of the memory cell MC includes a source structure 204, a channel structure 210 disposed on the source structure 204, a gate structure 208 disposed on the sidewall of the channel structure 210, and a gate dielectric layer 212 disposed between the gate structure 208 and the channel structure 210, a drain structure 214 disposed on the channel structure 210, and a capacitor structure SN disposed on the drain structure 214. The capacitor structure SN is the storage node of the memory cell MC.

In some embodiments of the present invention, the first device layer L1 further includes conductive structures for assisting the memory cells MC to be electrically connected to the bit lines BL. For example, as shown in FIG. 4, the first device layer L1 further includes a plurality of conductive structures 201 (only one conductive structure 201 is shown in FIG. 4) to electrically connect the memory cells MC to the bit lines BL. In some embodiments of the present invention, the memory cells may respectively include a contact structure 202 under the source structure 204 to electrically connect the source structure 204 to the associated conductive structure 201 (or bit line BL). In some embodiments of the present invention, the memory cells may respectively include a contact structure 206 on the source structure 204 to electrically connect the source structure 204 to the channel structure 210.

The source structures 204, the drain structures 214, the gate structures 208, the contact structures 202, and the contact structures 206 of the memory cells respectively include a conductive material, such as a metal conductive material, a non-metal conductive material, or a combination thereof. The suitable metal conductive materials include tungsten (W), copper (Cu), aluminum (Al), titanium (Ti), tantalum (Ta), a compound, an alloy or a composite layer of the above metal materials, but are not limited thereto. The suitable non-metal conductive materials include amorphous silicon, poly silicon, doped silicon, or a combination thereof, but are not limited thereto.

The channel structure 210 of each memory cell MC is vertically disposed between the source structure 204 and the drain structure 214. The bottom end of the channel structure 210 is electrically connected to the source structure 204 through the contact structure 206. The top end of the channel structure 210 is electrically connected to the drain structure 214. In some embodiments of the present invention, the channel structure 210 includes a dielectric core 210b and a semiconductor layer 210a disposed between the sidewall of the dielectric core 210b and the gate dielectric layer 212. The dielectric core 210b includes a dielectric material such as silicon oxide ($SiO_2$) or silicon nitride (SiN), but is not limited thereto. The semiconductor layer 210a includes a semiconductor material, such as silicon, poly silicon, or a metal oxide semiconductor material, but is not limited thereto.

The gate dielectric layer 212 may include a single dielectric layer or multiple dielectric layers. The material of the gate dielectric layer 212 may include silicon oxide ($SiO_2$), silicon nitride (SiN), silicon oxynitride (SiON), silicon carbide nitride (SiCN), high-k dielectric materials such as hafnium oxide ($HfO_2$), hafnium silicon oxide ($HfSiO_4$), hafnium silicon oxynitride (HfSiON), aluminum oxide (AlO), zinc oxide ($ZrO_2$), titanium oxide ($TiO_2$) and other metal oxide dielectrics, or a combination of the above materials, but is not limited thereto.

The capacitor structure SN The channel structure 210 of each memory cell MC includes a bottom electrode that is vertically disposed on the drain structure 214, a capacitor dielectric layer covering on the surface of the bottom electrode, and a top electrode on the capacitor dielectric layer and capacitively coupled with the bottom electrode through the capacitor dielectric layer. The bottom electrode and the top electrode respectively include a conductive material, such as a metal conductive material. The suitable metal conductive materials include tungsten (W), copper (Cu), aluminum (Al), titanium (Ti), tantalum (Ta), a compound, an alloy or a composite layer of the above metal materials, but are not limited thereto. In some embodiments of the present invention, the top electrode may include a semiconductor material, such as poly silicon. The capacitor dielectric layer includes a dielectric material, such as a dielectric material selected from the aforementioned materials suitable for the gate dielectric layer 208, but is not limited thereto.

The bit lines BL (only one bit line BL is shown in FIG. 4) for controlling the memory cells MC may be disposed in the first device layer L1 and under memory cells MC, and are electrically connected to the source structures 204 of the memory cells MC through the contact structures 202. In some embodiments of the present invention, the bit lines BL and the associated conductive structures 201 are integrally formed in a same material layer as a monolithic one-piece structure, including a same material, such as the aforementioned suitable metal conductive material. The bit lines BL may be electrically connected to the conductive structures 102 in the second device layer L2 through the interconnecting structures 104, respectively. The conductive structures 102 may be a portion of the first peripheral region 22 or the second peripheral region 24 that control the bit lines BL.

The word lines WL for controlling the memory cells MC are disposed in the first device layer L1 and between the source structures 204 and the drain structures 214 of the memory cells MC along a vertical direction. In some embodiments of the present invention, the word lines WL and the gate structures 208 are integrally formed in a same material layer as a monolithic one-piece structure, including a same material, such as the aforementioned suitable metal conductive material. In some embodiments of the present invention, the gate structures 208 of the memory cells MC are the portions of the word lines overlapping the channel structures 210. The word lines WL are electrically connected to the third peripheral region 26 or the fourth peripheral region 28 that control the word lines WL through the interconnecting structure 106.

In some embodiment, the bit lines BL (and the conductive structures 201) are formed in a first metal layer M1, the contact structures 202 are formed in a second metal layer M2, the source structures 204 are formed in a third metal layer M3, the gate structures 208 and the word lines WL are formed in a fourth metal layer M4, and the drain structures 214 are formed in a fifth metal layer M5. The first metal layer M1, the second metal layer M2, the third metal layer M3, the fourth metal layer M4, and the fifth metal layer M5 are sequentially disposed from a lower portion of the first device layer L1 (near the substrate L0) to a top portion of the first device layer L1 (away the substrate L0). The first device layer L1 further includes interlayer dielectric layers made of, for example, silicon oxide ($SiO_2$) or silicon nitride (SiN) disposed between the aforementioned metal layers and the memory cells.

Figure 5:
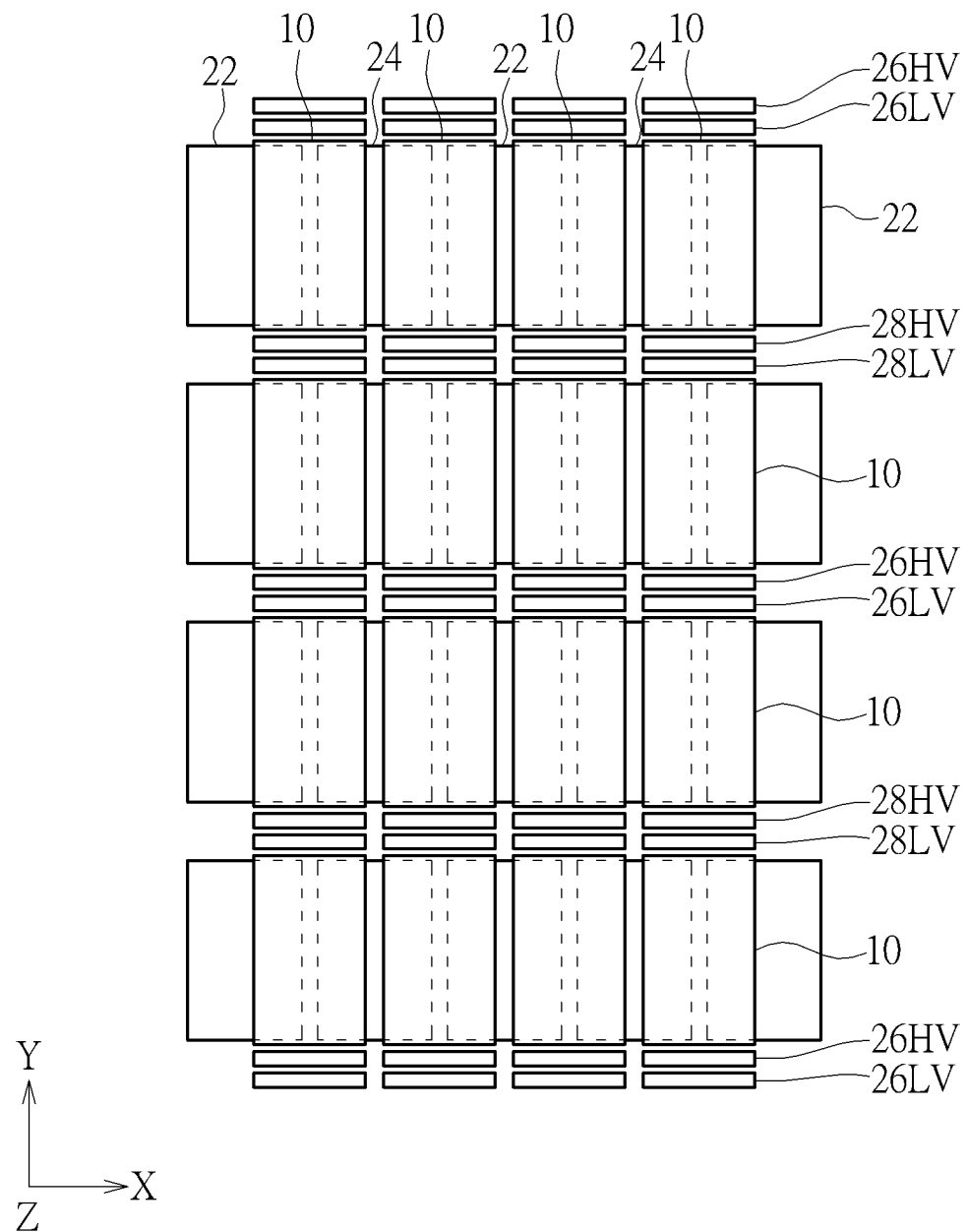
FIG. 5 is a schematic top view illustrating the layout of a memory structure according to one embodiment of the present invention.
Figure 6:
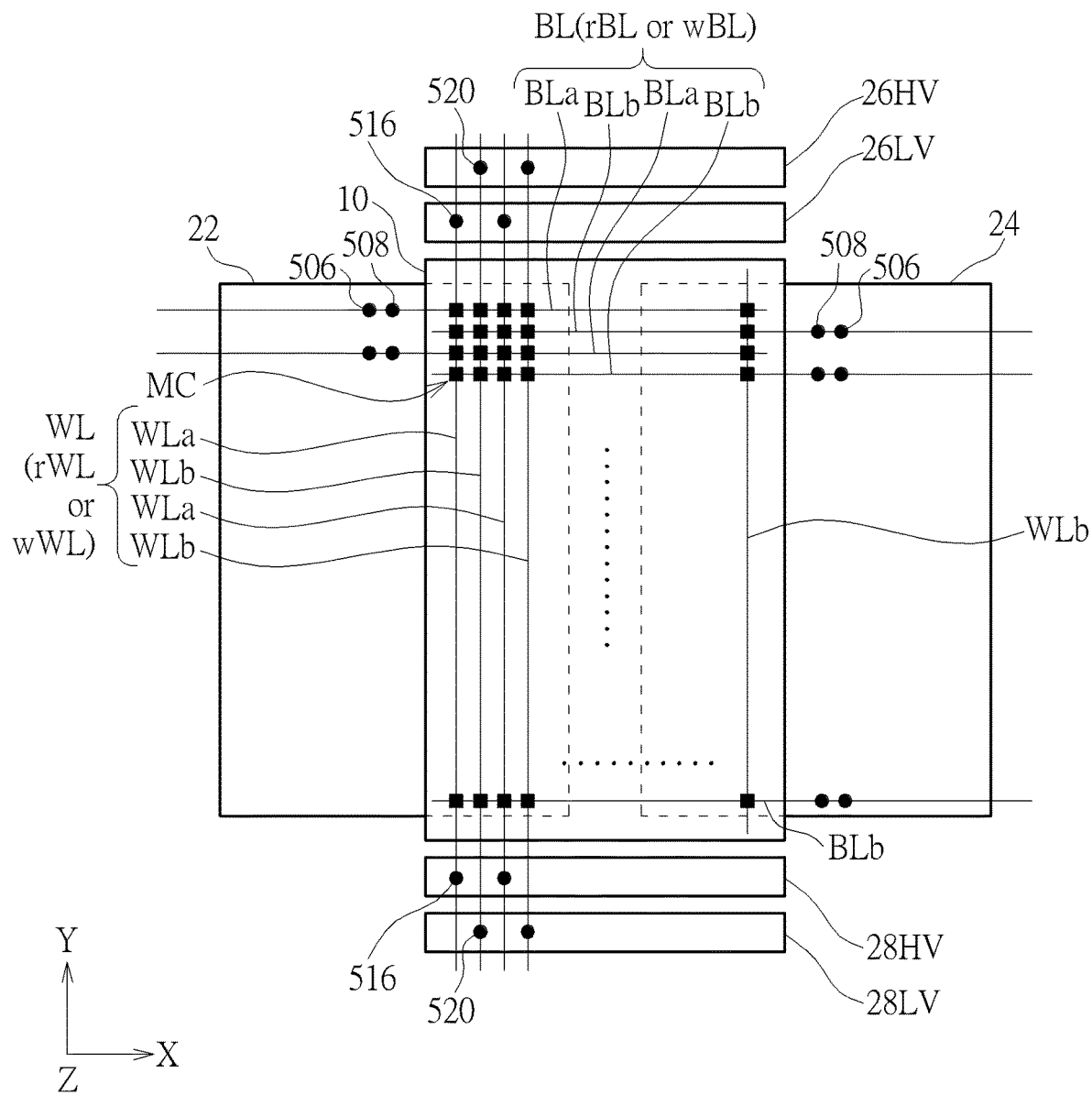
FIG. 6 is a schematic top view showing a layout of a memory structure according to one embodiment of the present invention.

Please refer to FIG. 5 and FIG. 6, which are schematic top views showing layouts of a memory structure on the XY plane according to another embodiment of the present invention. To simplify the drawing, only one memory region of the memory structure and the peripheral regions related to controlling the memory region are shown in FIG. 6. It should be understood by those skilled in the art that the following description, based on FIG. 6, is applicable to other memory regions and peripheral regions of the memory structure.

A major difference between the embodiment shown in FIG. 5 and FIG. 6 and the embodiment shown in FIG. 2 and FIG. 3 is that, the third peripheral regions 26 are divided into third low voltage peripheral regions 26LV and third high voltage peripheral regions 26HV, and the fourth peripheral regions 28 are divided into fourth low voltage peripheral regions 28LV and fourth high voltage peripheral regions 28HV. The layout shown in FIG. 5 and FIG. 6 is compatible with memory cells having 4 control terminals controlled by 2 bit lines BL and 2 word lines WL.

As shown in FIG. 5, the memory structure includes a plurality of memory regions 10 and a plurality of peripheral regions for controlling the memory cells MC of the memory regions 10. The memory regions 10 are arranged into rows and columns along the X direction and the Y direction. The peripheral regions 20 include first peripheral regions 22, second peripheral regions 24, third low voltage peripheral regions 26LV, third high voltage peripheral regions 26HV, fourth low voltage peripheral regions 28LV, and fourth high voltage peripheral regions 28HV. The memory regions 10 are formed in the first device layer L1, and the peripheral regions 20 are formed in the second device layer L2 (see FIG. 1). In some cases, some of the peripheral regions 20 not overlapped with the memory regions 10 (such as the third low voltage peripheral regions 26LV, third high voltage peripheral regions 26HV, fourth low voltage peripheral regions 28LV, and fourth high voltage peripheral regions 28HV) may be formed in the first device layer L1. The first peripheral regions 22 and the second peripheral regions 24 respectively include peripheral circuits for controlling the bit lines BL, such as row decoders and sense amplifiers. The third low voltage peripheral regions 26LV, the third high voltage peripheral regions 26HV, the fourth low voltage peripheral regions 28LV, and the fourth high voltage peripheral regions 28HV respectively include peripheral circuits for controlling the word lines WL, such as column decoders. The first peripheral regions 22 and the second peripheral regions 24 are alternately arranged in rows along the X direction, and are located under the memory regions 10, respectively between two adjacent memory regions 10 and partially overlapped with the two adjacent memory regions 10 along a vertical direction (or in the top view). The third low voltage peripheral regions 26LV, the third high voltage peripheral regions 26HV, the fourth low voltage peripheral regions 28LV, and the fourth high voltage peripheral regions 28HV are arranged in respective rows along the X direction, and are arranged in pairs between and adjacent to the upper and lower edges of the memory regions 10, without overlapping the memory regions 10.

As shown in FIG. 6, the bit lines BL of the memory structure include read bit lines rBL and write bit lines wBL. The word lines WL of the memory structure include read word lines rWL and write word lines wWL. The read bit lines rBL and the write bit lines wBL respectively extend along the X direction and are arranged in parallel along the Y direction. The read word lines rWL and the write word lines wWL extend along the Y direction and are arranged in parallel along the X direction. To simplify the drawings, the read bit line rBL and the write bit line wBL that control the same memory cell MC are represented by a same straight line, and the read word line rWL and the write word line wWL that control the same memory cell MC are represented by a same straight line. The intersection regions of the straight lines representing the word lines WL and the straight lines representing the bit lines are approximately the locations of the memory cells MC.

The first peripheral region 22 controls the odd rows of bit lines BLa (including odd rows of read bit lines rBL and write bit lines wBL). The second peripheral region 24 controls the even rows of bit lines BLb (including even rows of read bit lines rBL and write bit lines wBL) are controlled by the second peripheral region 24. The third low voltage peripheral region 26LV controls the odd columns of read word lines rWL. The fourth high voltage peripheral region 28HV controls the odd columns of write word lines wWL. The fourth low voltage peripheral region 28LV controls the even columns of read word lines rWL. The third high voltage peripheral region 26HV controls the even columns of write word lines wWL.

In some embodiments of the present invention, the first peripheral region 22 simultaneously controls the odd rows of bit lines BLa from the memory region 10 shown in FIG. 6 and a neighboring memory region (not shown) that is next to the left side of the memory region 10 and is overlapped with the first peripheral region 22. The second peripheral region 24 simultaneously controls the even rows of bit lines BLb from the memory region 10 shown in FIG. 6 and a neighboring memory region (not shown) that is next to the right side of the memory region 10 and is overlapped with the first peripheral region 22. The third low voltage peripheral region 26LV simultaneously controls the odd columns of read word lines rWL from the memory regions 10 shown in FIG. 6 and a neighboring memory region (not shown) adjacent to the upper side of the memory region 10. The fourth high voltage peripheral region 28HV simultaneously controls the odd columns of write word lines wWL from the memory regions 10 shown in FIG. 6 and a neighboring memory region (not shown) adjacent to the lower side of the memory region 10. The fourth low voltage peripheral region 28LV simultaneously controls the even columns of read word lines rWL from the memory regions 10 shown in FIG. 6 and a neighboring memory region (not shown) adjacent to the lower side of the memory region 10. The third high voltage peripheral region 26HV simultaneously controls the even columns of write word lines wWL from the memory regions 10 shown in FIG. 6 and a neighboring memory region (not shown) adjacent to the upper side of the memory region 10.

Please continue to refer to FIG. 6. The memory structure further includes a plurality of interconnecting structures to electrically connect the bit lines and word lines to associated peripheral regions. For example, the third interconnecting structures 506 and the fourth interconnecting structures 508 schematically annotated on the straight lines representing the bit lines BL are used to electrically connect the read bit lines rBL and the write bit lines wBL to the first peripheral region 22 or the second peripheral region 24. The eight interconnecting structures 516 and the tenth interconnecting structures 520 schematically annotated on the straight lines representing the word lines WL are used to electrically connect the read word lines rWL and the write word lines wWL to the third low voltage peripheral regions 26LV, the third high voltage peripheral regions 26HV, the fourth low voltage peripheral regions 28LV, or the fourth high voltage peripheral regions 28HV. The arrangements of the third interconnecting structures 506, the fourth interconnecting structures 508, the eight interconnecting structures 516, and the tenth interconnecting structures 520 are not limited to the design of FIG. 6, and may be adjusted according to design needs as long as being able to electrically connect the bit lines BL and word lines WL to associated peripheral regions.

Figure 7:
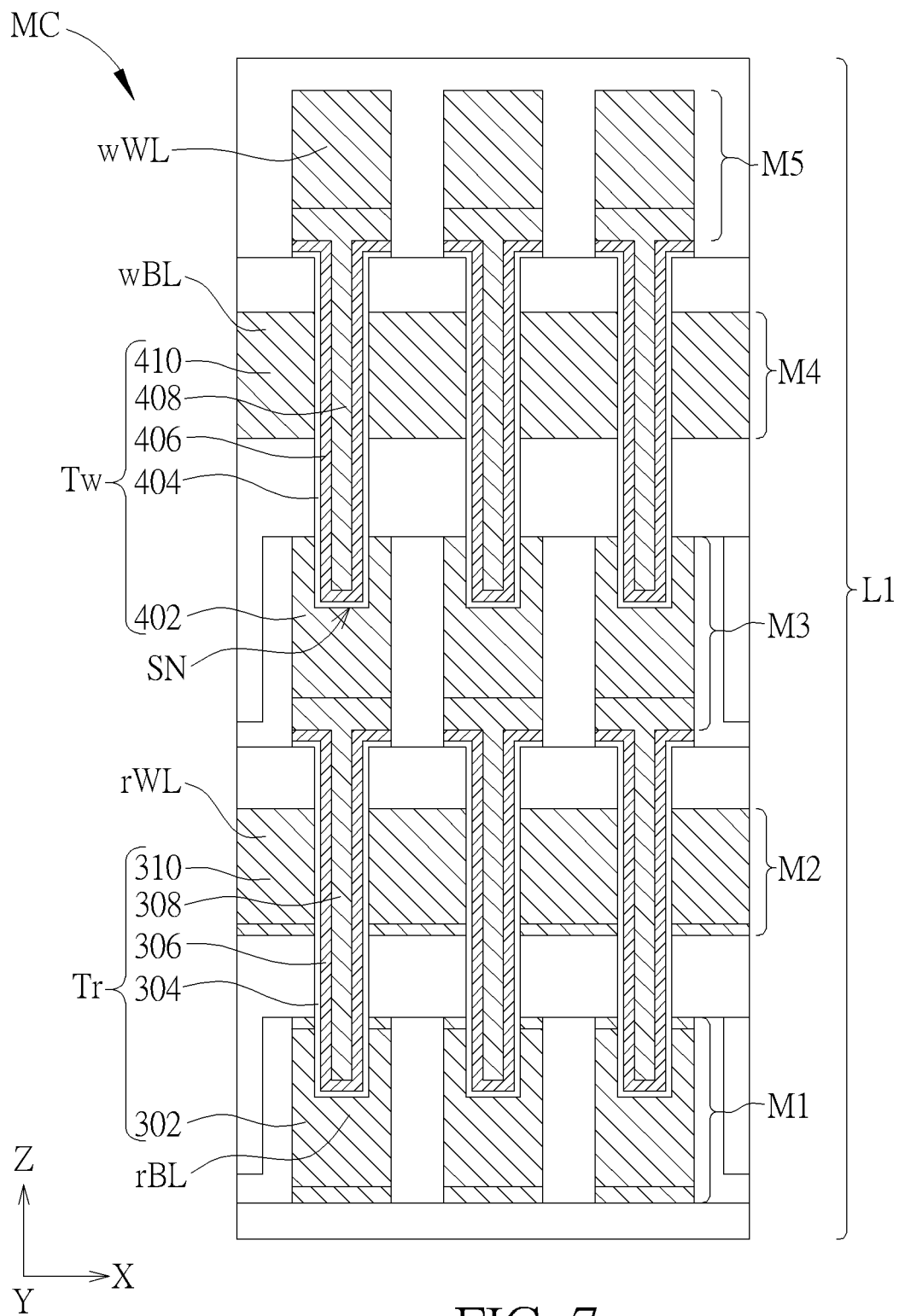
FIG. 7 is a schematic cross-sectional view of a memory structure according to an embodiment of the present invention.

Please refer to FIG. 7, which is a schematic cross-sectional view of a memory structure according to an embodiment of the present invention, wherein the memory cells of the memory structure are respectively composed of two vertically stacked vertical channel transistors (2T), wherein a parasitic capacitor between the two transistors is the storage node of the memory cell. The memory cell of the memory structure shown in FIG. 7 has four control terminals that are respectively controlled by a read bit line, a read word line, a write bit line, and a write word line. By implementing the memory structure as shown in FIG. 7 and the layout design as shown in FIG. 5 and FIG. 6, a memory structure having improved cell ratio may be obtained.

As shown in FIG. 7, the memory structure includes a first device layer L1 disposed on a substrate (not shown). The first device layer L1 includes a plurality of memory cells MC. Each memory cell MC includes a read transistor Tr and a write transistor Tw that is vertically stacked on the read transistor Tr. The read transistor Tr includes a first gate structure 308, a first channel layer 304 covering on the sidewall and bottom surface of the first gate structure 308, a first gate dielectric layer 306 interposing between the first gate structure 308 and the first channel layer 304, a first drain structure 310 that directly contacts the portion of the first channel layer 304 on the upper sidewall of the first gate structure 308, and a first source structure 302 that directly contacts the portion of the first channel layer 304 on the lower sidewall of the first gate structure 308. The write transistor Tw includes a second gate structure 408, second channel layer 404 covering on the sidewall and bottom surface of the second gate structure 408, a second gate dielectric layer 406 interposing between the second gate structure 408 and the second channel layer 404, a second drain structure 410 that directly contacts the portion of the second channel layer 404 on the upper sidewall of the second gate structure 408, and a second source structure 402 that directly contacts the portion of the second channel layer 404 on the lower sidewall of the second gate structure 408.

The first gate structure 308 of the read transistor Tr and the second source structure 402 of the write transistor Tw are electrically connected, and may be integrally formed as a monolithic one-piece structure. The first drain structure 310 is electrically connected to a read word line rWL, and may be integrally formed with the read word line rWL as a monolithic one-piece structure. The first source structure 302 is electrically connected to a read bit line rBL, and may be integrally formed with the read bit line rBL as a monolithic one-piece structure. The second drain structure 410 is electrically connected to a write bit line wBL, and may be integrally formed with the write bit line wBL as a monolithic one-piece structure. The second gate structure 408 is electrically connected to a write word line wWL, and may be integrally formed with the write word line wWL as a monolithic one-piece structure. The capacitor structure SN formed by the second source structure 402 is the storage node of the memory cell MC.

The first gate structure 308, the first drain structure 310, the first source structure 302, the second gate structure 408, the second drain structure 410, and the second source structure 402 respectively include a conductive material, such as a metal conductive material, a non-metal conductive material, or a combination thereof. The suitable metal conductive materials include tungsten (W), copper (Cu), aluminum (Al), titanium (Ti), tantalum (Ta), a compound, an alloy or a composite layer of the above metal materials, but are not limited thereto. The suitable non-metal conductive materials include amorphous silicon, poly silicon, doped silicon, or a combination thereof, but are not limited thereto. The first channel layer 304 and the second channel layer 404 respectively include a semiconductor material, such as silicon, poly silicon, or a metal oxide semiconductor material, but is not limited thereto. The first gate dielectric layer 306 and the second gate dielectric layer 406 respectively include a single dielectric layer or multiple dielectric layers. The material of the first gate dielectric layer 306 and the second gate dielectric layer 406 may include silicon oxide ($SiO_2$), silicon nitride (SiN), silicon oxynitride (SiON), silicon carbide nitride (SiCN), high-k dielectric materials such as hafnium oxide ($HfO_2$), hafnium silicon oxide ($HfSiO_4$), hafnium silicon oxynitride (HfSiON), aluminum oxide (AlO), zinc oxide ($ZrO_2$), titanium oxide ($TiO_2$) and other metal oxide dielectrics, or a combination of the above materials, but is not limited thereto.

In some embodiments of the present invention, the first source structures 302 and the read bit lines rBL are formed in a first metal layer M1. The first drain structures 310 and the read word lines rWL are formed in a second metal layer M2. The second source structures 402 are formed in a third metal layer M3. The second drain structures 410 and the write bit lines wBL are formed in a fourth metal layer M4. The write word lines wWL are formed in a fifth metal layer M5. The first metal layer M1, the second metal layer M2, the third metal layer M3, the fourth metal layer M4, and the fifth metal layer M5 are sequentially disposed from a lower portion of the first device layer L1 (near the substrate) to a top portion of the first device layer L1 (away the substrate). The first device layer L1 further includes interlayer dielectric layers made of, for example, silicon oxide ($SiO_2$) or silicon nitride (SiN) disposed between the aforementioned metal layers and the memory cells.

Figure 8:
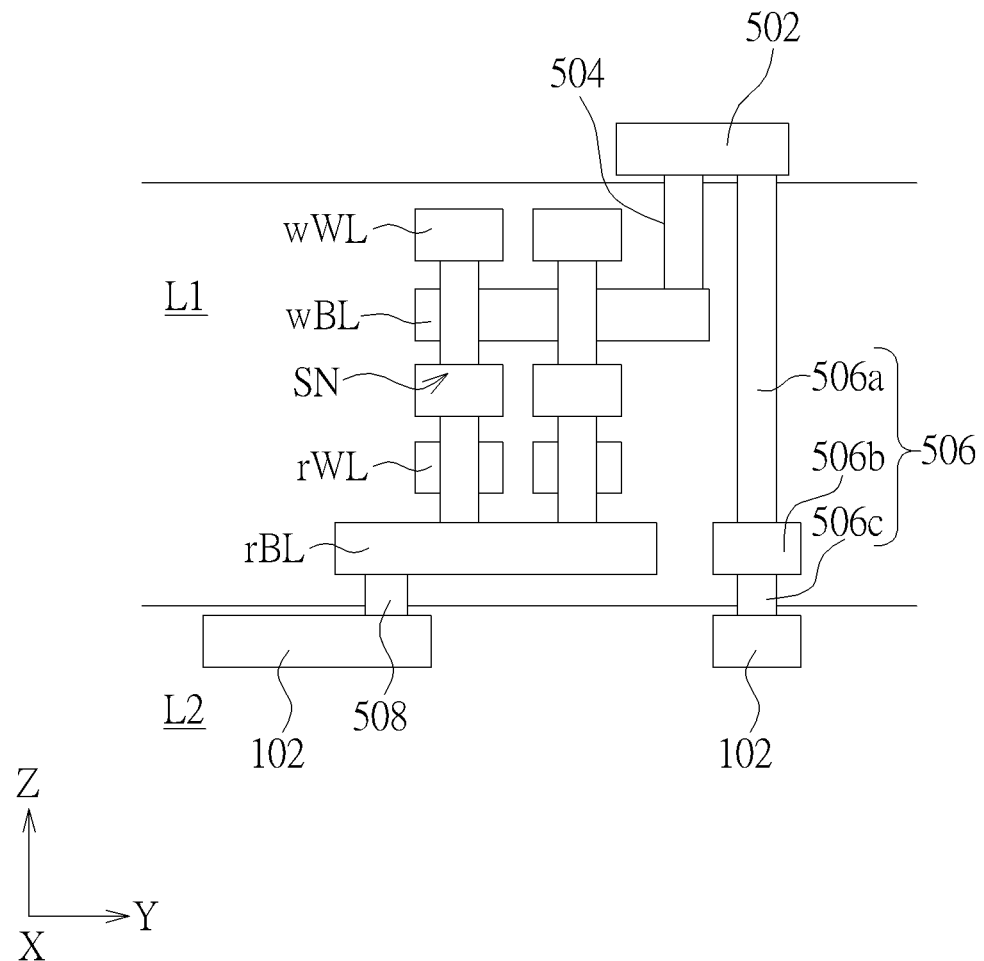
FIG. 8 and FIG. 9 are schematic cross-sectional views of a memory structure according to one embodiment of the present invention.
Figure 9:
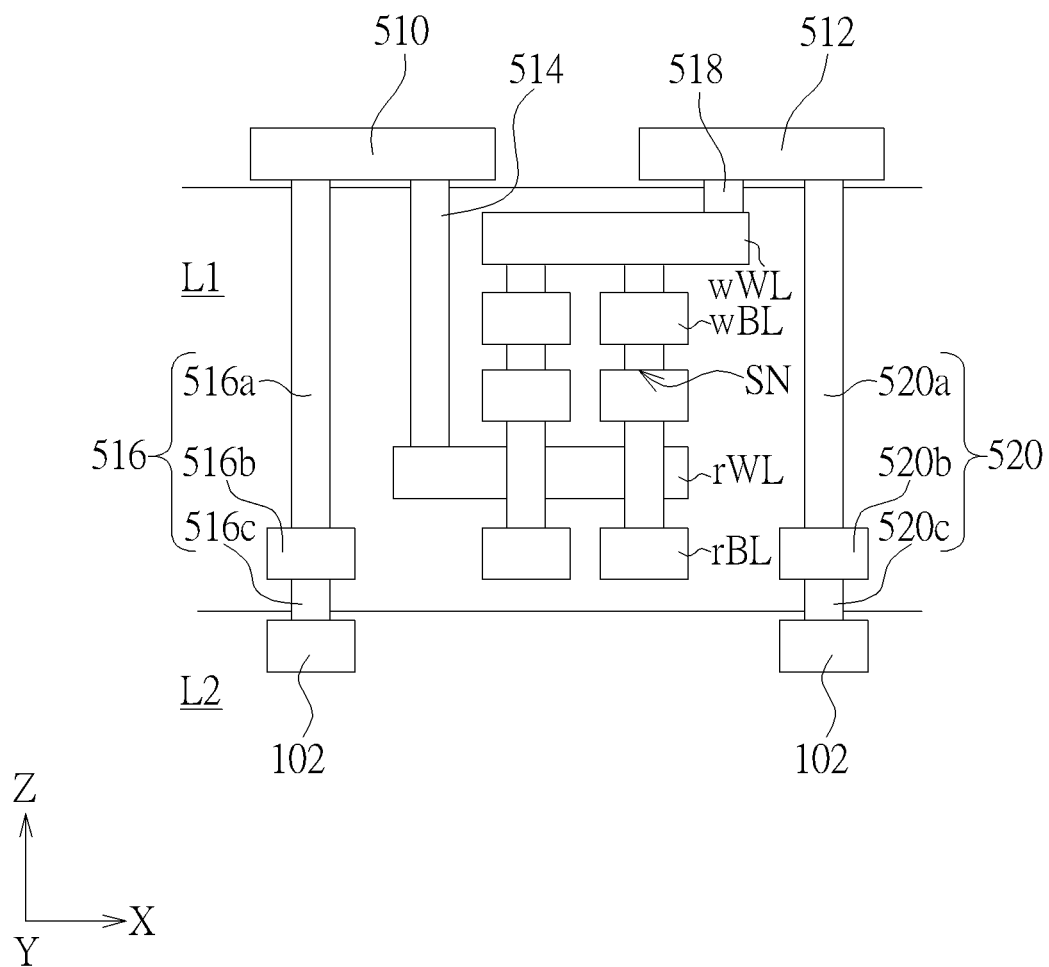

Please refer to FIG. 8 and FIG. 9, which are schematic cross-sectional views of a memory structure along different cross-sectional directions according to one embodiment of the present invention. As shown in FIG. 8 and FIG. 9, the memory structure includes a substrate (not shown), a second device layer L2 on the substrate, and a first device layer L1 on the second device layer L2. The second device layer L2 includes a plurality of conductive structures 102 that may belong to the first peripheral region 22, the second peripheral region 24, the third low voltage peripheral region 26LV, the third peripheral region 26HV, the fourth peripheral region 28LV, or the fourth peripheral region 28HV. The first device layer L1 includes a plurality of memory cells MC as shown in FIG. 7, and also includes the read bit lines rBL, write bit line wBL, read word lines rWL, and write word lines wWL that are electrically connected to the corresponding peripheral regions in the second device layer L2 through the interconnecting structures formed in or on the first device layer L1 to control the memory cells MC. For example, the write bit line wBL may be electrically connected to one of the conductive structures 102 belonging to the first peripheral region 22 or the second peripheral region 24 through the first interconnecting structure 502 on the first device layer L1 and the second interconnecting structure 504 and the third interconnecting structure 506 in the first device layer L1. The read bit line rBL may be electrically connected to another one of the conductive structures 102 belonging to the first peripheral region 22 or the second peripheral region 24 through the fourth interconnecting structure 508 in the first device layer L1. The read word line rWL may be electrically connected to one of the conductive structures 102 belonging to the third low voltage peripheral region 26LV or the fourth low voltage peripheral region 28LV through the tenth interconnecting structure 520 on the first device layer L1 and the seventh interconnecting structure 514 and eighth interconnecting structure 516 in the first device layer L1. The write word line wWL may be electrically connected to one of the structures 102 belonging to the third high voltage peripheral region 26HV or the fourth high voltage peripheral region 28HV through the sixth interconnecting structure 512 on the first device layer L1 and the ninth interconnecting structure 518 and tenth interconnecting structure 520 in the first device layer L1.

The first interconnecting structure 502, the second interconnecting structure 504, the third interconnecting structure 506, the fourth interconnecting structure 508, the fifth interconnecting structure 510, the sixth interconnecting structure 512, the seventh interconnecting structure 514, the eighth interconnecting structure 516, the ninth interconnecting structure 518, and the tenth interconnecting structure 520 may be respectively composed of a single conductive portion or multiple conductive portions. For example, in the embodiment shown in FIG. 8 and FIG. 9, the third interconnecting structure 506 includes three conductive portions 506a, 506b, and 506c. The eighth interconnecting structure 516 includes three conductive portions 516a, 516b, and 516c. The tenth interconnecting structure 520 includes three conductive portions 520a, 520b, and 520c. The conductive portions may include vias and/or metal lines, but are not limited thereto. The material of the conductive portions may include conductive metals, such as tungsten (W), copper (Cu), aluminum (Al), titanium (Ti), tantalum (Ta), a compound, an alloy or a composite layer of the above metal materials, but are not limited thereto.

In conclusion, the memory structure and layout provided in the embodiments of the present invention have the memory regions and peripheral regions formed in different device layers, so that the peripheral regions do not occupy areas between memory regions. In this way, an improved cell ratio and a larger memory capacity in a limited area of the memory structure may be achieved. Furthermore, the design of vertically overlapping the memory regions and the peripheral regions may improve the design flexibility and shorten the routing distance of interconnections, so that power loss due to interconnection impedance may also be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory structure, comprising:
    a substrate;
    a first device layer disposed on the substrate;
    a plurality of memory regions in the first device layer;
    a plurality of word lines and bit lines in the first device layer to control memory cells of the memory regions;
    a second device layer disposed between the substrate and the first device layer; and
    a plurality of first peripheral regions and second peripheral regions alternately arranged in the second device layer, wherein in a top view, the first peripheral regions and the second peripheral regions respectively partially overlap adjacent two of the memory regions, wherein odd rows of the bit lines are electrically connected to the first peripheral regions, and even rows of the bit lines are electrically connected to the second peripheral regions.

2. The memory structure according to claim 1, wherein the first peripheral regions and the second peripheral regions respectively comprise row decoders and sense amplifiers.

3. The memory structure according to claim 1, further comprising:
    a plurality of third peripheral regions and fourth peripheral regions arranged in the second device layer and between upper edges and lower edges of the memory regions from a top view, wherein odd columns of the word lines are electrically connected to the third peripheral regions, and even columns of the word lines are electrically connected to the fourth peripheral regions.

4. The memory structure according to claim 3, wherein in the top view, the third peripheral regions and the fourth peripheral regions and the memory regions are not overlapped.

5. The memory structure according to claim 3, wherein the third peripheral regions and the fourth peripheral regions respectively comprise column decoders.

6. The memory structure according to claim 1, wherein the memory cells respectively comprise:
    a source structure;
    a channel structure on the source structure;
    a gate structure on a sidewall of the channel structure and electrically connected to one of the word lines;
    a gate dielectric layer between the gate structure and the channel structure;
    a drain structure on the channel structure;

a capacitor structure on the drain structure; and
a contact structure under the source structure to electrically connect the source structure to one of the bit lines.

7. The memory structure according to claim 6, wherein the channel structure comprises a dielectric core and a semiconductor layer along a sidewall of the dielectric core and interposing between the dielectric core and the gate dielectric layer.

8. The memory structure according to claim 6, wherein the bit lines are formed in a first metal layer, the contact structure is formed in a second metal layer, the source structure is formed in a third metal layer, the gate structure and the word lines are formed in a fourth metal layer, the drain structure is formed in a fifth metal layer, wherein the first metal layer, the second metal layer, the third metal layer, the fourth metal layer, and the fifth metal layer are sequentially arranged from a lower portion to an upper portion of the first device layer.

9. The memory structure according to claim 1, wherein the memory cells respectively comprise:
a read transistor; comprising:
a first gate structure;
a first channel layer covering on a sidewall and a bottom surface of the first gate structure;
a first gate dielectric layer between the first gate structure and the first channel layer;
a first drain structure, in direct contact with a portion of the first channel layer on an upper portion of the first gate structure; and
a first source structure, in direct contact with a portion of the first channel layer on a lower portion of the first gate structure; and
a write transistor disposed on the read transistor and comprising:
a second gate structure;
a second channel layer covering on a sidewall and a bottom surface of the second gate structure;
a second gate dielectric layer between the second gate structure and the second channel layer;
a second drain structure, in direct contact with a portion of the second channel layer on an upper portion of the second gate structure; and
a second source structure between the first gate structure and the second gate structure and in direct contact with a top surface of the first gate structure and a portion of the second channel layer on a lower portion of the second gate structure.

10. The memory structure according to claim 9, wherein the word lines comprise read word lines and write word lines, the bit lines comprise read bit lines and write bit lines, wherein the first drain structure is electrically connected to one of the read word lines, the first source structure is electrically connected to one of the read bit lines, the second gate structure is electrically connected to one of the write word lines, and the second drain structure is electrically connected to one of the write bit lines.

11. The memory structure according to claim 10, wherein the first source structure and the read bit lines are formed in a first metal layer, the first drain structure and the read word lines are formed in a second metal layer, the second source structure is formed in a third metal layer, the second drain structure and the write bit lines are formed in a fourth metal layer, the write word lines are formed in a fifth metal layer, wherein the first metal layer, the second metal layer, the third metal layer, the fourth metal layer, and the fifth metal layer are sequentially arranged from a lower portion to an upper portion of the first device layer.

12. The memory structure according to claim 10, further comprising:
a first interconnecting structure disposed on the first device layer; and
a second interconnecting structure, a third interconnecting structure, and a fourth interconnecting structure in the first device layer, wherein the second interconnecting structure electrically connects one of the write bit lines to the first interconnecting structure, the third interconnecting structure electrically connects the first interconnecting structure to one of the first peripheral regions or one of the second peripheral regions, the fourth interconnecting structure electrically connects one of the read bit lines to one of the first peripheral regions or one of the second peripheral regions.

13. The memory structure according to claim 10, further comprising:
third low voltage peripheral regions and fourth high voltage peripheral regions in the second device layer and adjacent to upper edges or lower edges of the memory regions; and
third high voltage peripheral regions and fourth low voltage peripheral regions in the second device layer and adjacent to the third low voltage peripheral regions and fourth high voltage peripheral regions, wherein even columns of the write word lines are electrically connected to the third high voltage peripheral regions, even columns of the read word lines are electrically connected to the fourth low voltage peripheral regions, odd columns of the write word lines are electrically connected to the fourth high voltage peripheral regions, and odd columns of the read word lines are electrically connected to the third low voltage peripheral regions.

14. The memory structure according to claim 13, further comprising:
a fifth interconnecting structure and a sixth interconnecting structure on the first device layer; and
a seventh interconnecting structure, an eighth interconnecting structure, a ninth interconnecting structure, and a tenth interconnecting structure in the first dielectric layer, wherein the seventh interconnecting structure electrically connects one of the read word lines to the fifth interconnecting structure, the eighth interconnecting structure electrically connects the fifth interconnecting structure to one of the third low voltage peripheral regions or one of the fourth low voltage peripheral regions, the ninth interconnecting structure electrically connects one of the write word lines to the sixth interconnecting structure, and the tenth interconnecting structure electrically connects the sixth interconnecting structure to one of the third high voltage peripheral regions or one of the fourth high voltage peripheral regions.

15. The memory structure according to claim 13, wherein the third low voltage peripheral regions, the fourth high voltage peripheral regions, the third high voltage peripheral regions, and the fourth low voltage peripheral regions respectively comprise column decoders.

16. The memory structure according to claim 1, wherein the areas of the memory regions overlapped with the first peripheral regions and the areas of the memory regions overlapped with the second peripheral regions are the same.

17. A memory structure, comprising:
a substrate;
a first device layer disposed on the substrate;

a plurality of memory regions in the first device layer and arranged into rows and columns along a first direction and a second direction that is perpendicular to the first direction;

a plurality of word lines and bit lines in the first device layer to control memory cells of the memory regions;

a second device layer disposed between the substrate and the first device layer; and a plurality of first peripheral regions and second peripheral regions alternately arranged along the first direction in the second device layer, wherein in a top view, the first peripheral regions and the second peripheral regions respectively partially overlap adjacent two of the memory regions.

* * * * *